Patented Oct. 5, 1943

2,330,813

UNITED STATES PATENT OFFICE 2,330,813

CARROTING SOLUTION

Carl H. Donner, Summit, N. J., assignor to The Chapal Donner Corporation, Newark, N. J., a corporation of New Jersey No Drawing. Application July 31, 1940,
Serial No. 348,837

9 Claims. (Cl. 8—112)

This invention relates to the carroting of fur and similar animal fibers to impart felting properties thereto.

In the carroting of furs, solutions of mercury salts have long been used. Mercury, however, is a highly poisonous substance belonging to the group of so-called "cumulating" poisons, because it accumulates in the system and causes chronic ailments not infrequently resulting in death. The danger is increased by the fact that the mercury vapors cannot be detected by odor to warn persons exposed to the atmosphere contaminated by it.

Due to the toxic effects of mercury, frequent endeavors have been made to substitute other substances. Many substitutes for mercury have been suggested for use in carroting solutions, mainly oxidizing and hydrolyzing compounds, and numerous formulae have been proposed. However, while such solutions have avoided the poisonous efforts of mercury they have not otherwise achieved the results desired in the carroting of furs. Various hypotheses have been evolved in attempted explanation of the complicated reactions occurring in the process of carroting furs, which hypotheses generally assume that hydrolysis and oxidation of the protein material in the fur are responsible for the felting properties; but it is to be borne in mind that the reactions involved are complicated and that theories have not advanced to such extent as to explain occurring phenomena with certainty.

An object of my invention is to provide a quick and inexpensive carroting process, which is not harmful to operators, and which imparts to the fur consistently good felting properties, without the irregularity of results encountered in other methods.

Another object is the provision of a carroting solution for attaining the foregoing results. The invention further provides a carroting solution which enables the fur to which it is applied to dry without burning or becoming sticky, and to shrink quickly and properly in the subsequent felting operation. Said solution also endows the fiber with a high luster and brilliancy and finer feel. It furthermore results in the production of carroted furs, which can be dyed easily prior to the felting operation without retarding seriously the shrinking of the fur during felting.

Out of many experiments, I have discovered that an aqueous solution of sulphuric, nitric, and chloric acids gives results equal to, or even superior to, mercury carrots. An aqueous solution containing about 130 grams of chloric acid ($HClO_3.7H_2O$), 15 to 20 grams of nitric acid ($HNO_3$) and 30 grams of sulphuric acid ($H_2SO_4$) in one liter of solution is preferable. The concentration and proportions may, however, vary within relatively wide limits, depending upon the kind of fur, mode of operation and results desired; the lowest concentration of a still workable solution being about 20 grams of chloric, and 3 grams each of sulphuric and nitric acids, per liter of solution. The highest admissible concentration is approximately double that of the above-specified preferred solution. Optimum proportions and concentrations for particular types of fur are determined by test.

Solutions containing the three acids above specified produce results distinctly superior to those obtained by solutions containing only chloric and sulphuric, or chloric and nitric, acids. The presence of the three acids referred to is found to yield furs which have all the satisfactory felting properties discussed above and which are easily dyed without undue retardation of shrinkage of the fur in the felting operation. The results obtained are furthermore uniform and reproducible with a consistency which is in marked distinction to the irregular action of other non-mercury carroting solutions.

The carroting solution of my invention, comprising three acids in suitable concentrations, can be applied to the production of either "white" or "yellow" carrot fur. For producing yellow carrot fur, the latter is dried almost immediately, or shortly after the carroting operation. The drying may be done at a temperature of approximately 130°–200° F. for from about 30 minutes to an hour. In an operation of this kind the space and cost of piling the fur is saved, and the felt made from yellow carrot fur is tighter than that from white carrot fur.

To produce white carrot fur, the fur, after carroting, is covered in piles for from about twenty-four to about seventy-two hours. Drying may then take place at about 120° F. for about one and a half hours in an oven with forced draft.

For practical purposes, I prefer to prepare the solution in more concentrated form than the preferred solution, after which the concentrated solution may be diluted as desired. The density of such concentrated solution is about 14–15° Bé. For the white carrot treat, the concentrated solution is preferably diluted with water to about 7–10° Bé. and for the yellow carrot treat to about 4–6° Bé., although concentrations as low as 2° Bé. may be employed for the yellow carrot treat. The aforementioned densities are at 60° F.

The carroting solutions of my invention are applied to the fur in known manner, either by brush or mechanically, or by immersion.

There may be substituted for the sulphuric acid another hydrolyzing acid, such as phosphoric acid (H₃PO₄) which is not volatile at the temperatures of drying the carroted fur. In lieu of chloric acid, perchloric acid may be employed.

The carroting solutions of my invention give consistent reproducible results which are found satisfactory in every respect. As indicated above, mixtures of only two acids are not satisfactory. Chloric (or perchloric), nitric, and sulphuric (or other suitable hydrolyzing acid, such as phosphoric) are essential to the achievement of the results attained by my invention.

While, as previously noted, the chemical reactions involved in the carroting of furs are highly complex and little understood, I believe that the chloric (or perchloric) acid acts chiefly as an oxidizing agent, and that its hydrolyzing activity is less pronounced. Nitric and sulphuric (or phosphoric) acids, on the other hand, are regarded chiefly as hydrolyzing agents though they act to some extent also as oxidizing agents. Their action differs in the intensity of the hydrating (swelling) and depolymerizing activities. It is suspected also that nitric acid differs in the mode of action because of formation of minute amounts of nitro-compounds which are not as easily wetted by aqueous solutions as products of reaction with sulphuric (or phosphoric) acid. Proper balance between the degree of multiple reactions entering into this complicated play decides finally the quality of the felt.

The chemistry of the carroting process is very little explored on account of the difficulties encountered, and the hypothesis advanced here is presented in an attempt to elucidate in this complex problem merely the action of the discovered mixture of acids. Nevertheless, I wish to emphasize that my theoretical explanations may be subject to revision and do not bear upon the validity of my discovery which constitutes the present invention.

In the appended claims, the expression "a chloric acid" includes both chloric and perchloric acid.

I claim:

1. An aqueous carroting solution for treating fur and the like, said solution containing as active carroting agents a chloric acid, nitric acid, and sulphuric acid.

2. An aqueous carroting solution for treating fur and the like, said solution containing as active carroting agents a chloric acid, nitric acid, and phosphoric acid.

3. An aqueous carroting solution for treating fur and the like, said solution containing as active carroting agents chloric acid, nitric acid, and sulphuric acid in about the following amounts per liter of solution:

| | Grams |
|---|---|
| Chloric acid | 20–260 |
| Nitric acid | 3– 40 |
| Sulphuric acid | 3– 60 |

4. An aqueous carroting solution for treating fur and the like, said solution containing as active carroting agents chloric acid, nitric acid, and sulphuric acid.

5. An aqueous carroting solution for treating fur and the like, said solution containing as active carroting agents a chloric acid, nitric acid, and an acid of the class consisting of sulphuric and phosphoric acids.

6. An aqueous carroting solution for treating fur and the like, said solution containing as active carroting ingredients chloric acid, nitric acid, and sulphuric acid, said ingredients being present in amounts not less than about the following in grams per liter of solution: chloric acid 20, nitric acid 3, and sulphuric acid 3, said solution having a density of about two to fifteen degrees Baumé.

7. An aqueous carroting solution for treating fur and the like, said solution containing as active carroting agents chloric acid, nitric acid, and an acid of the class consisting of sulphuric and phosphoric acids, with one liter of said solution containing from about 20 to about 260 grams of chloric acid.

8. An aqueous carroting solution for treating fur and the like, said solution containing as active carroting agents a chloric acid, nitric acid, and a hydrolyzing acid of the class consisting of sulphuric and phosphoric acid, with one liter of said solution containing from about 3 to about 60 grams of said hydrolyzing acid.

9. An aqueous carroting solution for treating fur and the like, said solution containing as active carroting agents chloric acid, nitric acid, and a hydrolyzing acid of the class consisting of sulphuric and phosphoric acids, with one liter of said solution containing from about 20 to about 260 grams of chloric acid, from about 3 to about 40 grams of nitric acid, and from about 3 to about 60 grams of said hydrolyizng acid.

CARL H. DONNER.